United States Patent
Sun et al.

(10) Patent No.: US 10,606,979 B1
(45) Date of Patent: Mar. 31, 2020

(54) VERIFYING EQUIVALENCE OF DESIGN LATENCY

(71) Applicant: Xilinx, Inc., San Jose, CA (US)

(72) Inventors: Shangzhi Sun, San Jose, CA (US); Bing Tian, San Jose, CA (US); Chaithanya Dudha, San Jose, CA (US)

(73) Assignee: XILINX, INC., San Jose, CA (US)

(*) Notice: Subject to any disclaimer, the term of this patent is extended or adjusted under 35 U.S.C. 154(b) by 6 days.

(21) Appl. No.: 16/001,206

(22) Filed: Jun. 6, 2018

(51) Int. Cl.
*G06F 17/50* (2006.01)

(52) U.S. Cl.
CPC ...... *G06F 17/5081* (2013.01); *G06F 2217/02* (2013.01); *G06F 2217/84* (2013.01)

(58) Field of Classification Search
CPC ............. G06F 17/5081; G06F 2217/84; G06F 2217/02
See application file for complete search history.

(56) References Cited

U.S. PATENT DOCUMENTS

| | | | |
|---|---|---|---|
| 7,143,376 B1 | 11/2006 | Eccles | |
| 7,203,919 B2* | 4/2007 | Suaris | G06F 17/5031 716/108 |
| 7,337,100 B1* | 2/2008 | Hutton | G06F 17/5068 703/13 |
| 7,559,040 B1* | 7/2009 | Albrecht | G06F 17/505 716/104 |
| 7,644,382 B2* | 1/2010 | Budumuru | G06F 17/504 716/103 |
| 7,890,901 B2* | 2/2011 | Gemmeke | G06F 17/504 716/106 |
| 7,945,880 B1* | 5/2011 | Albrecht | G06F 17/5031 716/101 |
| 8,060,844 B2* | 11/2011 | Gidon | G06F 17/505 716/101 |
| 8,099,703 B1 | 1/2012 | Manovit et al. | |
| 8,302,048 B2* | 10/2012 | Pu | G06F 17/5031 716/108 |
| 8,429,580 B2* | 4/2013 | Yeung | G06F 17/504 716/103 |
| 8,443,317 B2* | 5/2013 | Hiraoglu | G06F 17/504 716/104 |
| 8,443,319 B2* | 5/2013 | Nodine | G06F 17/504 716/103 |
| 8,539,406 B2* | 9/2013 | Mahar | G06F 17/504 716/103 |

(Continued)

*Primary Examiner* — Naum Levin
(74) *Attorney, Agent, or Firm* — Cuenot, Forsythe & Kim, LLC

(57) ABSTRACT

Verifying a circuit design may include, in response to modification of the circuit design involving at least one of inserting or removing a flip-flop, determining, using computer hardware, latency change values for pins of components of the circuit design, determining, using the computer hardware, total latency for the pins of the components of the circuit design based, at least in part, upon the latency change values, and comparing, using the computer hardware, total latency of the pins of the components of the circuit design. Verifying the circuit design may also include detecting, using the computer hardware, a latency error within the circuit design based upon the comparing and generating, using the computer hardware, a notification of the latency error in the circuit design, wherein the notification specifies a type of the latency error detected.

20 Claims, 9 Drawing Sheets

(56) References Cited

U.S. PATENT DOCUMENTS

| | | | | |
|---|---|---|---|---|
| 8,578,311 B1* | 11/2013 | Baumgartner | ...... | G06F 17/5081 |
| | | | | 716/107 |
| 8,607,178 B2* | 12/2013 | Taylor | ................ | G06F 17/5045 |
| | | | | 716/100 |
| 8,799,838 B2* | 8/2014 | Tanimoto | ............ | G06F 17/5045 |
| | | | | 716/107 |
| 8,893,071 B1* | 11/2014 | Gaide | ................ | G06F 17/5054 |
| | | | | 716/113 |
| 9,740,529 B1* | 8/2017 | Shei | .................... | G06F 17/5045 |
| 9,836,568 B1* | 12/2017 | Ganusov | ............. | G06F 17/5081 |
| 10,282,508 B1* | 5/2019 | Le | ....................... | G06F 17/5081 |

* cited by examiner

VERIFYING EQUIVALENCE OF DESIGN LATENCY

TECHNICAL FIELD

This disclosure relates to integrated circuits (ICs) and, more particularly, to verifying equivalence of latency within circuit designs.

BACKGROUND

Functional equivalence checking is an important aspect of electronic design automation (EDA). Functional equivalence checking is routinely used during integrated circuit design to ensure that two different representations of a circuit design exhibit the same behavior. As the circuit design moves through different phases of the design cycle and/or different optimizations are applied to the circuit design, functional equivalence checking may be performed to ensure that the optimizations introduced into the circuit design do not change behavior of the circuit design. This may include ensuring that the latency of the circuit design has not become unbalanced.

In the context of sequential logic synthesis, for example, where retiming and/or pipelining operations may be performed on the circuit design, the complexity of verifying equivalence of circuit design latency is further exacerbated due, at least in part, to changes in flip-flop positions within the circuit design. In the case of retiming, for example, formal verification is typically performed. In the usual case, users define elaborate flip-flop mapping rules and provide the rules to the verification tool. The rules are used to guide the verification tool. The creation of these rules is itself a complex undertaking due, at least in part, to possible cascades of deleted and/or inserted flip-flops. In the case of pipelining, functional equivalence checking is typically performed by simulating the circuit design. The simulation a time-consuming endeavor particularly given the size and complexity of modern circuit designs.

SUMMARY

In one or more embodiments, a method may include determining, using computer hardware, latency change values for pins of components of the circuit design, wherein the circuit design is modified by at least one of inserting a flip-flop or removing a flip-flop, determining, using the computer hardware, total latency for the pins of the components of the circuit design based, at least in part, upon the latency change values, and comparing, using the computer hardware, total latency of the pins of the components of the circuit design to determine a mismatch. The method may also include detecting, using the computer hardware, a latency error within the circuit design based upon the comparing and generating, using the computer hardware, a notification of the latency error in the circuit design, wherein the notification specifies a type of the latency error detected.

In one or more embodiments, a system includes a memory configured to store program code and a processor coupled to the memory. The processor, in response to executing the program code, is configured to initiate operations. The operations may include determining latency change values for pins of components of the circuit design, wherein the circuit design is modified by at least one of inserting a flip-flop or removing a flip-flop, determining total latency for the pins of the components of the circuit design based, at least in part, upon the latency change values, and comparing total latency of the pins of the components of the circuit design to determine a mismatch. The operations may also include detecting a latency error within the circuit design based upon the comparing and generating a notification of the latency error in the circuit design, wherein the notification specifies a type of the latency error detected.

In one or more embodiments, a computer program product includes a computer readable storage medium having program code stored thereon. The program code is executable by a processor to perform operations. The operations may include determining latency change values for pins of components of a circuit design, wherein the circuit design is modified by at least one of inserting a flip-flop or removing a flip-flop, determining total latency for the pins of the components of the circuit design based, at least in part, upon the latency change values, and comparing total latency of the pins of the components of the circuit design to determine a mismatch. The operations may also include detecting a latency error within the circuit design based upon the comparing and generating a notification of the latency error in the circuit design, wherein the notification specifies a type of the latency error detected.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, verifying equivalence of latency within circuit designs. In accordance with the inventive arrangements described within this disclosure, a system is provided that is capable of analyzing a circuit design to detect latency errors. For example, the system may detect imbalances in latency caused by the introduction and/or removal of flip-flops from the circuit design. The system is capable of pinpointing the source of the latency error(s). In one or more embodiments, the circuit design is capable of automatically modifying the circuit design to correct detected latency errors.

In sequential logic synthesis, most logic errors arise from unbalanced latency transformations relating to re-convergent paths or self-loops. By detecting these sorts of latency issues, the system is able to resolve a significant number of latency issues in circuit designs in a more computationally efficient manner than other conventional techniques. As such, the system is able to detect and/or correct latency errors in less time than is the case with conventional techniques involving formal verification and/or simulation. The embodiments described within this disclosure are able to perform verification with a runtime that scales approximately linearly with the size of the circuit design undergoing verification.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
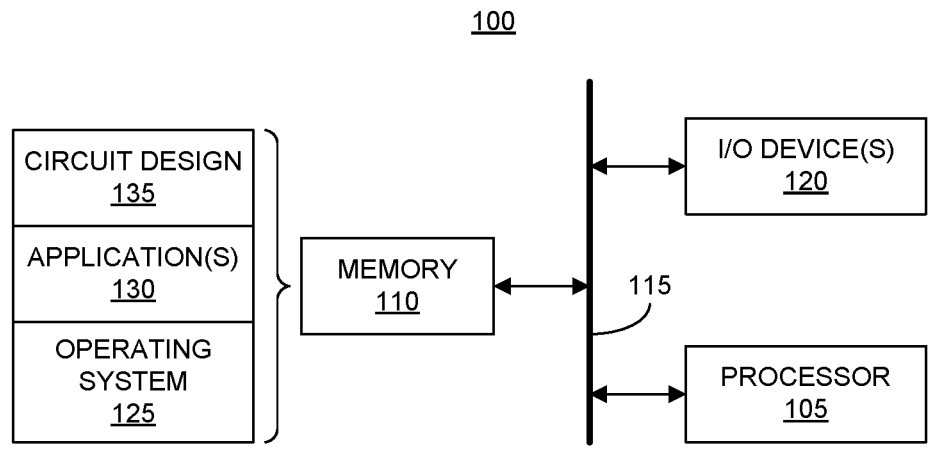
FIG. 1 illustrates an example system for use with one or more embodiments described within this disclosure.

FIG. 1 illustrates an example system 100 for use with one or more embodiments described herein. System 100 is an example of computer hardware that may be used to implement a computer, a server, a portable computer such as a laptop or a tablet computer, or other data processing system. A system or device implemented using computer hardware is capable of performing the various operations described herein relating to processing a circuit design for implementation within an IC.

In the example of FIG. 1, system 100 includes at least one processor 105. Processor 105 is coupled to memory 110 through interface circuitry 115. System 100 is capable of storing computer readable instructions (also referred to as "program code") within memory 110. Memory 110 is an example of computer readable storage media. Processor 105 is capable of executing the program code accessed from memory 110 via interface circuitry 115.

Memory 110 may include one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM" or static RAM or "SRAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 100 may also include one or more cache memories (not shown) that provide temporary storage of at least some program code in order to reduce the number of times program code must be retrieved from a bulk storage device during execution.

Memory 110 is capable of storing program code and/or data. For example, memory 110 is capable of storing various routines, programs, objects, components, logic, other suitable instructions, and/or other data structures. For purposes of illustration, memory 110 stores an operating system 125, one or more application(s) 130, and a circuit design 135. In one or more embodiments, application(s) 130 include an electronic design automation (EDA) application. The EDA application is capable of performing one or more operations of a design flow (e.g., synthesis, placement, routing, and/or bitstream generation) and the various operations described herein relating to verifying equivalence of circuit design latency. The EDA application is capable of performing the operations described herein to implement circuit design 135, or a derivative thereof, within a target IC. The target IC may have an architecture the same as or similar to the architecture described herein in connection with FIG. 6.

System 100, e.g., processor 105, is capable of executing operating system 125 and application(s) 130 to perform the operations described within this disclosure. As such, operating system 125 and application(s) 130 may be considered an integrated part of system 100. Further, it should be appreciated that any data used, generated, and/or operated upon by system 100 (e.g., processor 105) are functional data structures that impart functionality when employed as part of the system.

Examples of interface circuitry 115 include, but are not limited to, a system bus and an input/output (I/O) bus. Interface circuitry 115 may be implemented using any of a variety of bus architectures. Examples of bus architectures may include, but are not limited to, Enhanced Industry Standard Architecture (EISA) bus, Accelerated Graphics Port (AGP), Video Electronics Standards Association (VESA) local bus, Universal Serial Bus (USB), and Peripheral Component Interconnect Express (PCIe) bus.

System 100 further may include one or more I/O devices 120 coupled to interface circuitry 115. I/O devices 120 may be coupled to system 100, e.g., interface circuitry 115, either directly or through intervening I/O controllers. Examples of I/O devices 120 include, but are not limited to, a keyboard, a display device, a pointing device, one or more communication ports, and a network adapter. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

System 100 may include fewer components than shown or additional components not illustrated in FIG. 1 depending upon the particular type of device and/or system that is implemented. In addition, the particular operating system, application(s), and/or I/O devices included may vary based upon system type. Further, one or more of the illustrative components may be incorporated into, or otherwise form a portion of, another component. For example, a processor may include at least some memory. System 100 may be used to implement a single computer or a plurality of networked or interconnected computers each implemented using the architecture of FIG. 1 or an architecture similar thereto.

The inventive arrangements described within this disclosure are capable of checking latency equivalence between two different versions of a circuit design. For example, as system 100 operates on circuit design 135, a new and different version of circuit design 135 is created. System 100, for example, may be used to perform sequential logic synthesis as part of a design flow. During sequential logic synthesis, system 100 may perform one or more retiming operations and/or one or more pipelining operations on circuit design 135. In other examples, system 100 may modify circuit design 135 in response to user instructions to do so.

System 100 is capable of verifying that the new version of circuit design 135 has the same latency as the prior version of circuit design 135 using the techniques described within this disclosure. System 100, for example, is capable of detecting whether the latency within the modified version of circuit design 135 is unbalanced. The latency equivalence checking performed by system 100 may be performed in a computationally efficient manner to detect latency errors in significantly less time than is the case with other known techniques such as formal verification and/or simulation. In one or more embodiments, system 100 is capable of automatically correcting one or more of the detected latency errors.

FIGS. 2A, 2B, 2C, and 2D illustrate example operations that may be performed by a system in verifying latency equivalence for a circuit design 200. A system such as system 100, as described in connection with FIG. 1, may perform the operations.

Figure 2A:
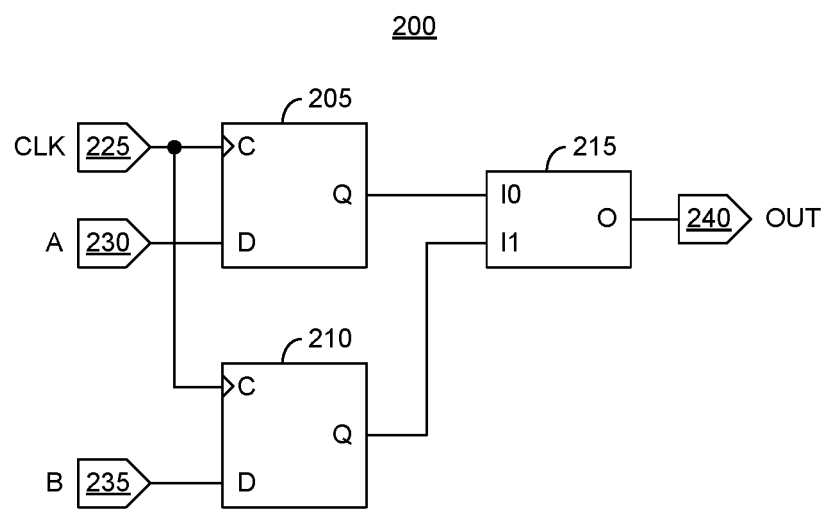
FIGS. 2A, 2B, 2C, and 2D illustrate example operations that may be performed by a system in verifying latency equivalence for a circuit design.

FIG. 2A illustrates an example of circuit design 200. In the example of FIG. 2A, circuit design 135 includes flip-flops 205 and 210 and a lookup table (LUT) 215. Circuit design 135 includes pins 225, 230, 235, and 240. Pin 225 receives a clock (CLK) signal. Pins 230 and 235 are primary inputs of circuit design 135. Pin 240 is a primary output of circuit design 200.

Pin 230 receives data signal A and pin 235 receives data signal B. Flip-flops 205 and 210 are clocked by the CLK signal. Flip-flop 205 receives data signal A at the D input. Flip-flop 210 receives data signal B at the D input. For example, flip-flops 205 and 210 may be D-type flip-flops. LUT 215 implements combinatorial logic and is not clocked. LUT 215 receives the output from each of flip-flops 205 and 210 and generates an output (OUT) data signal, which is provided on pin 240.

Figure 2B:
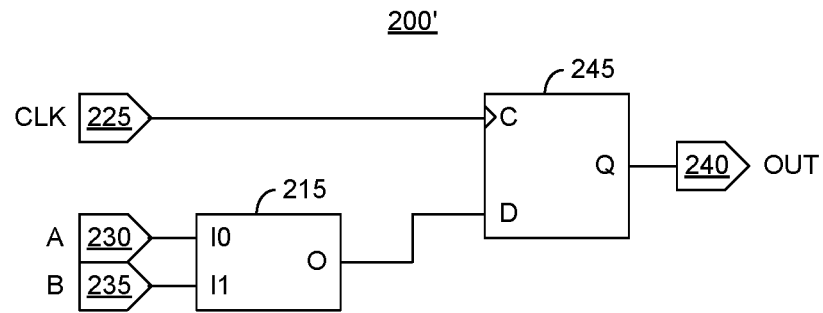

FIG. 2B illustrates a retimed version of circuit design 200 referred to as circuit design 200'. In the example of FIG. 2B, circuit design 200' is retimed by removing flip-flops 205 and 210 so that signals A and B are provided from pins 230 and 235 directly to LUT 215. Further, a flip-flop 245 is added immediately following LUT 215. Pin 240 is driven by output O of flip-flop 245.

Figure 2C:
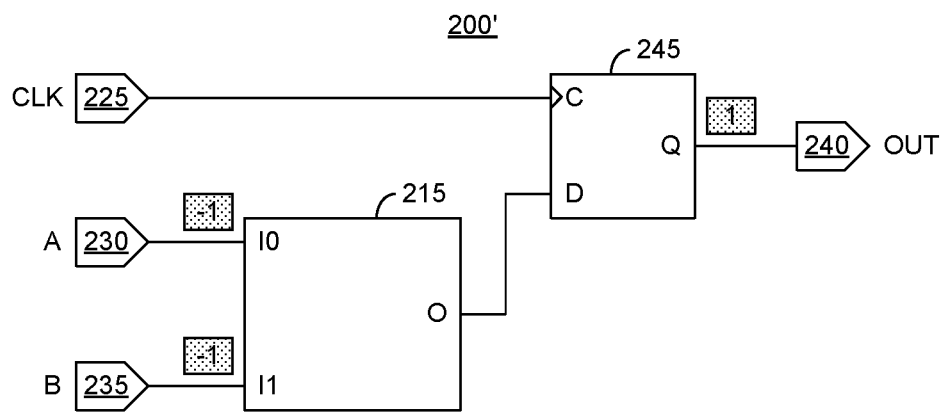

FIG. 2C illustrates the retimed version of circuit design 200 (e.g., circuit design 200') as the system performs latency equivalence verification. In the example of FIG. 2C, the system has annotated circuit design 200'. The annotations, which may be integer values referred to herein as "latency change values," indicate the types of operations performed by the system in terms of removing flip-flops, adding flip-flops, or making no change in the flip-flops with respect to pins of circuit design 200'. In order to more clearly show the annotations, the components of circuit design 200' are enlarged compared to FIG. 2B.

In one or more embodiments, a netlist may be modified so that each pin included therein may be associated with a latency change value. Each pin within the netlist corresponding to circuit design 200 and circuit design 200', for example, may be associated with a latency change value. Each latency change value represents the number of flip-flops changed for that pin. A positive latency change value indicates the number of flip-flops inserted just before, e.g., immediately before, the pin. A negative latency change value indicates the number of flip-flops removed just before, e.g., immediately before, the pin. A zero latency change value indicates no change to the number of flip-flops just before the pin. In some cases within this disclosure, zero latency change values are not indicated within the circuit designs.

In the example of FIG. 2C, circuit design 200' may be specified as a netlist. For purposes of illustration, the latency change values are shown within square, shaded bounding boxes in FIG. 2C. As pictured, input I0 and input I1 of LUT 215 each is associated with a latency change value of "−1" indicating that a flip-flop has been removed immediately before each respective pin. The latency change values of "−1" indicate that flip-flop 205, which fed input I0 of LUT 215, and flip-flop 210, which fed input I1 of LUT 215, have been removed.

At the output of flip-flop 245, which has been added to circuit design 200', the latency change value of "1" is added. The positive 1 latency change value indicates that a flip-flop has been added. For example, the pin of the circuit element that generated the OUT signal in FIG. 2A, which was the output of LUT 215, is now the Q output of newly added flip-flop 245. As such, the system assigns the latency change value of "1" to the pin (e.g., output Q of flip-flop 245) since the latency at the pin has increased.

Figure 2D:
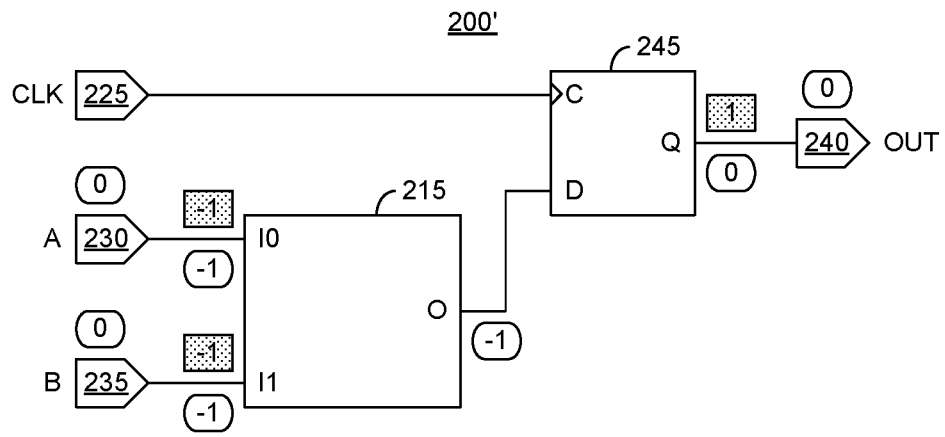

FIG. 2D illustrates the retimed version of circuit design 200 (e.g., circuit design 200') as the system performs latency equivalence verification. In one or more embodiments, the system is capable of analyzing circuit design 200' from primary inputs 230 and 235 to primary output 240. The system is capable of further annotating the netlist corresponding to circuit design 200' by summing the latency change values along the paths through circuit design 200'. The sum of latency change values, which are encapsulated within rounded bounding boxes, are determined by summing the latency change values along the paths and writing the sums at each synchronous input pin and synchronous output pin of the components of circuit design 200'. Each sum is referred to as a total latency and may be pin-specific.

For example, the system is capable of assigning each of pins 230 and 235 (e.g., the primary inputs) the sum of 0 since no changes to flip-flops occur prior to pins 230 and 235. Moving to the inputs of LUT 215, for each input pin I0 and I1, the system sums the latency change values on each path. Thus, input pins I0 and I1 of LUT 215 each is given a sum of "−1". Continuing along the signal path, the system also assigns the output O of LUT 215 a sum of "−1" since no other latency change values have been encountered along the path.

For purposes of illustration, latency change values of 0 are not shown in FIG. 2D. The sum at input D of flip-flop 245 remains "−1." The sum at output Q of flip-flop 245 becomes "0" since the "1" latency change value is added to the "−1" sum carried forward to flip-flop 245. As such, the resulting sum that is assigned to pin 240 (e.g., the primary output) is "0."

FIGS. 2A, 2B, 2C, and 2D, taken collectively, illustrate the use of latency change values for pins of the circuit design and the summation of such values along paths of the circuit design to generate total latencies for the pins. In particular embodiments, the system is capable of performing one or more different latency equivalence checks to detect latency errors within the circuit design based, at least in part, upon the latency change values and/or the total latencies.

FIGS. 3A, 3B, 3C, and 3D illustrate example operations that may be performed by a system in verifying latency equivalence for a circuit design. FIGS. 3A, 3B, 3C, and 3D illustrate the use of latency change values and total latencies for detecting a variety of different types of latency errors in circuit designs. A system such as system 100, as described in connection with FIG. 1, may perform the operations.

Figure 3A:
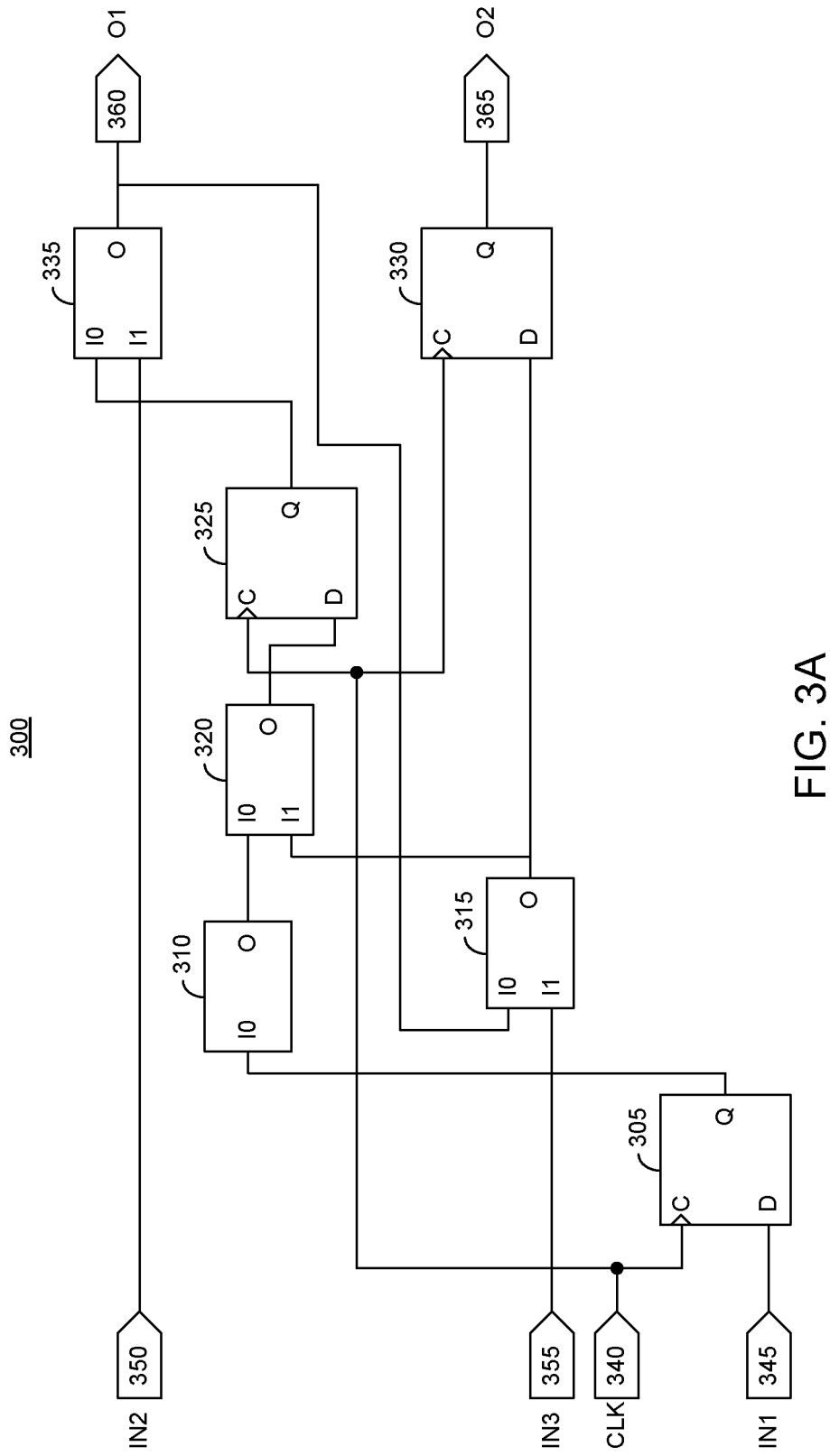
FIGS. 3A, 3B, 3C, and 3D illustrate example operations that may be performed by a system in verifying latency equivalence for a circuit design.

In the example of FIG. 3A, circuit design 300 includes flip-flops 305, 325, and 330, LUTs 310, 315, 320, and 335. Pin 340 receives the CLK signal. Pins 345, 350, and 355 are primary inputs of circuit design 300. Pins 345, 350, and 355 receive input data signals IN1, IN2, and IN3, respectively. Pin 355 receives the clock (CLK) signal. Pins 360 and 360 are primary outputs of circuit 300 and convey output signals O1 and O2, respectively.

Figure 3B:
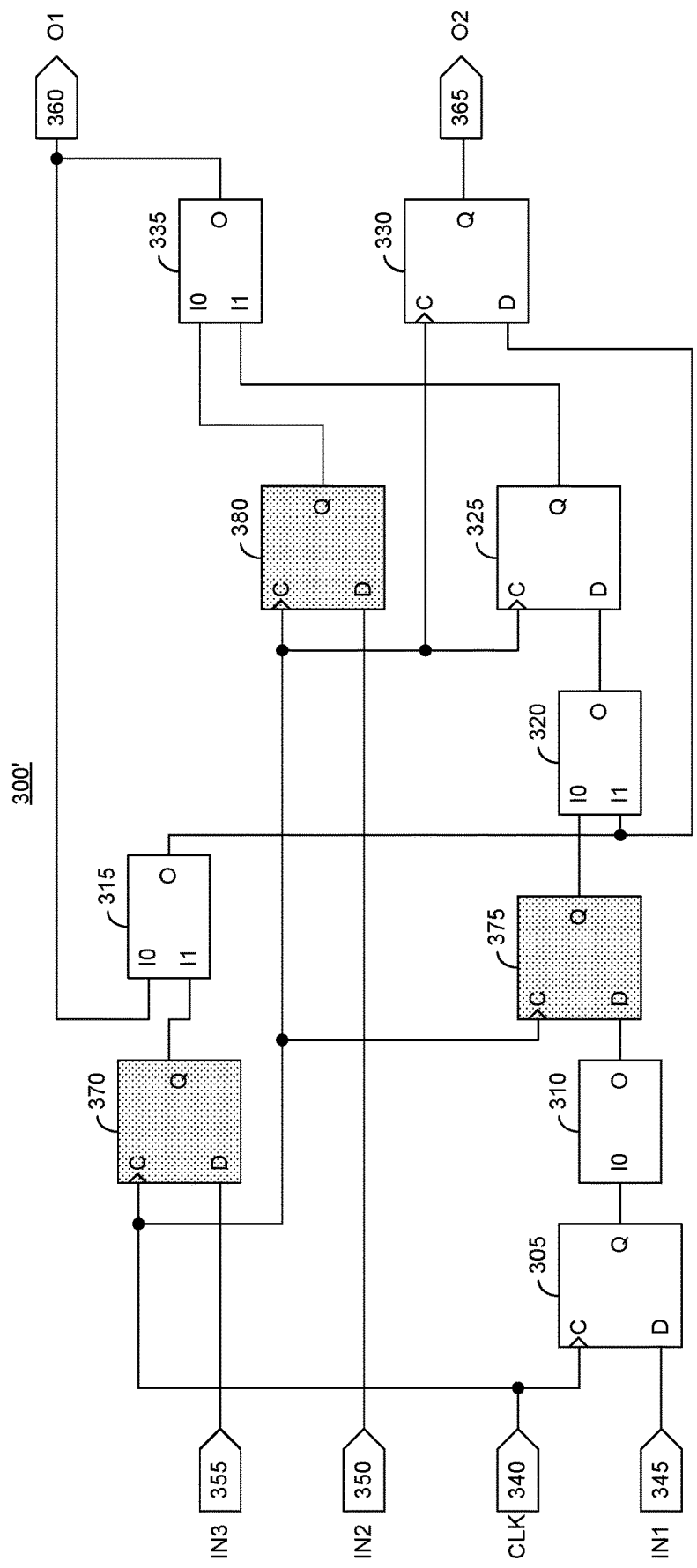

FIG. 3B illustrates a modified version of circuit design 300 referred to as circuit design 300'. In the example of FIG. 3B, circuit design 300' is modified by inserting three additional flip-flops 370, 375, and 380. In the example of FIG. 3B, flip-flops 370, 375, and 380 are illustrated with shading.

Figure 3C:
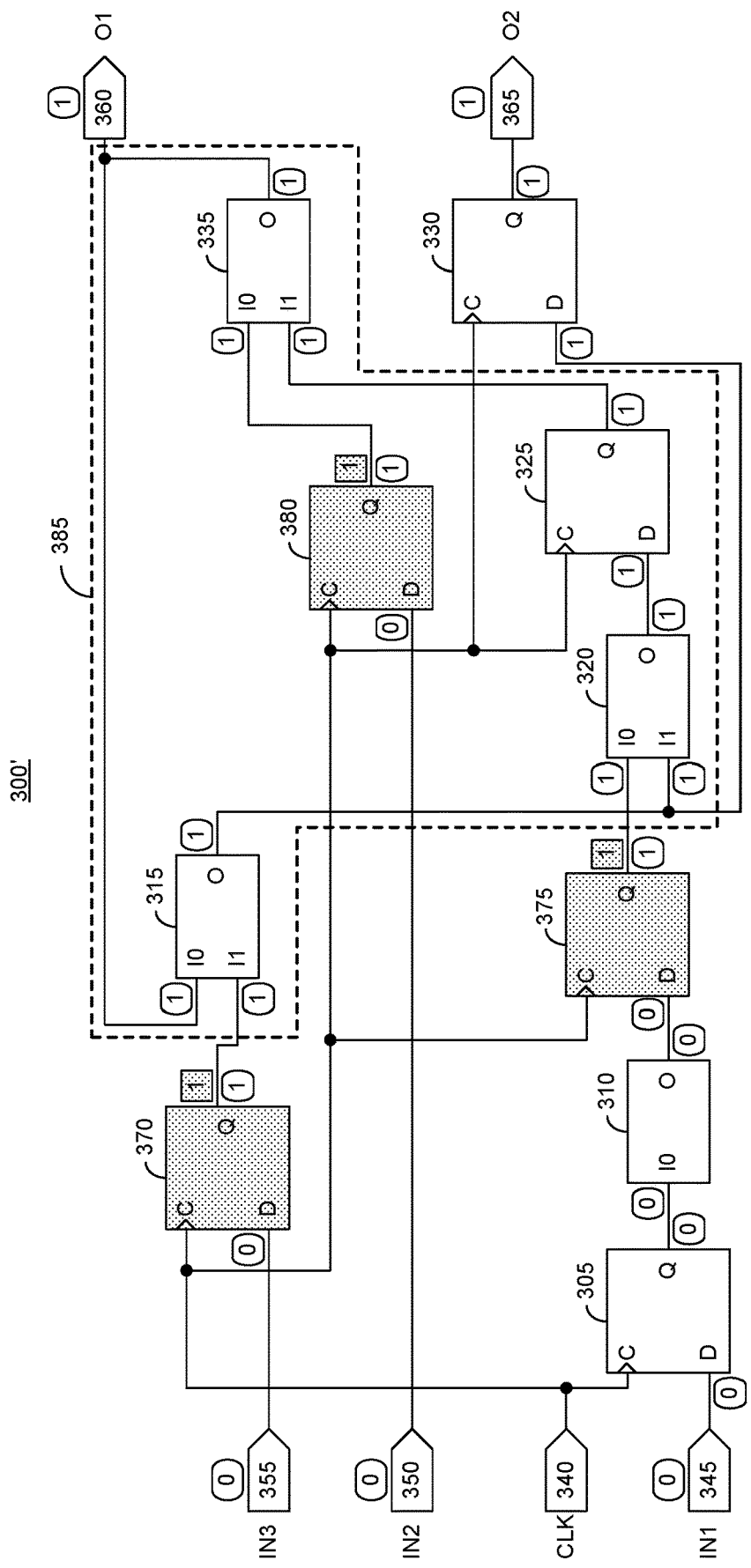

FIG. 3C illustrates the modified version of circuit design 300 (e.g., circuit design 300') as the system performs latency equivalence verification. In the example of FIG. 3C, the system has annotated circuit design 300' with respect to both latency change values and total latencies along the paths from the primary inputs to the primary outputs. As noted, latency change values are indicated in square, shaded bounding boxes while total latencies are illustrated in rounded bounding boxes.

In the example of FIG. 3C, the paths from pins 345, 350, and 355 up to the point where flip-flops 370, 375, and 380 are inserted have total latency of 0 and latency change values of 0. For purposes of illustration, latency change values of zero are not shown. The following illustrates an example of the system propagating latency change values through paths to determine total latencies for pins.

The system has added a latency change value of 1 at output Q of flip-flop 370. Accordingly, the system adds the latency change value of "1" to the total latency of "0" at input D of flip-flop 370 to obtain the total latency of "1," which is assigned to output pin Q of flip-flop 370.

The system has added a latency change value of 1 at output Q of flip-flop 375. Accordingly, the system adds the latency change value of "1" to the total latency of "0" at input D of flip-flop 375 to obtain the total latency of "1," which is assigned to output pin Q of flip-flop 375.

The system has added a latency change value of 1 at output Q of flip-flop 380. Accordingly, the system adds the latency change value of "1" to the total latency of "0" at input D of flip-flop 380 to obtain the total latency of "1," which is assigned to output pin Q of flip-flop 380.

The system is capable of performing a variety of latency equivalence checks for purposes of latency equivalence verification. If the system determines that any one of the checks fails or is not met, the system is capable of indicating that the modified circuit design has a latency error. In particular embodiments, the system is capable of correcting the latency error automatically through the insertion or removal of a flip-flop.

In one or more embodiments, the system is capable of performing a check by determining whether all of the synchronous input pins of each component, e.g., on a per component basis, in the circuit design have the same total latency. In other words, the system determines whether each of the synchronous input pins of each component in the circuit design have the same total latency. The system may perform the check for each circuit element with more than one synchronous input pin.

Within this disclosure, a synchronous signal is a signal, other than a clock signal, that only changes state in association with, e.g., in response to, a clock edge. For example, signals output from the Q outputs of clocked flip-flops are synchronous signals that may only change state with the clock edge. Signals output from LUTs are not considered synchronous signals. Asynchronous signals are signals that may change state immediately without waiting for a next clock edge. Examples of asynchronous signals include, but are not limited to, set signals, reset signals, and clear signals. For purposes of this disclosure and latency equivalence verification, asynchronous signals and/or pins are not considered. A pin that conveys a synchronous signal may be referred to as a synchronous pin.

Referring to FIG. 3C, the system is capable of checking that the total latency at input I0 and the total latency at input I1 of LUT 315 are the same. As pictured, the total latency at each of input I0 and input I1 of LUT 315 is 1 (the sums are equivalent). Similarly, the system is capable of checking that the total latency at the input I0 and the total latency at input I1 of LUT 320 are the same. As pictured, the total latency at each of input I0 and input I1 of LUT 320 is 1. The system is also capable of checking that the total latency at input I0 and the total latency at input I1 of LUT 335 is the same. As pictured, the total latency at each of input I0 and input I1 of LUT 335 is 1. The system need not check the total latency of input pins of circuit elements that have only a single input. In this regard, LUT 310 need not be checked.

In one or more embodiments, the system is capable of determining whether all of the primary outputs of the circuit design have the same total latency. Referring to the example of FIG. 3C, the system checks whether the total latencies at the primary output corresponding to pin 360 and the primary output corresponding to pin 365 are equivalent. As pictured, the primary output corresponding to pin 360 has a total latency of 1. The primary output corresponding to pin 365 has a total latency of 1. Since the total latency at each primary output is equivalent, the system determines that the primary outputs of circuit design 200' have the same total latency (e.g., a latency error is not detected).

In one or more embodiments, the system is capable of determining whether the total number of latency changes in each strongly connected component is zero. A strongly connected component refers to two or more components of the circuit design where each component is reachable from each other component. For example, in the case of circuit designs, strongly connected components result from the inclusion of a feedback path.

Referring to FIG. 3C, output O of LUT 335 feeds back to input I0 of LUT 315. The dashed line bounds strongly connected component 385 in circuit design 300'. Strongly connected component 385 is formed by the following components and signal path: output O of LUT 320 to input D of flip-flop 325, output Q of flip-flop 325 to input I1 of LUT 335, output O of LUT 335 to input I0 of LUT 315, output O of LUT 315 to input I1 of LUT 320. Entry points of a strongly connected component are inputs (e.g., pins) of components within the strongly connected component that receive a signal from outside of strongly connected component. In the example of FIG. 3C, the entry points of strongly connected component 385 are input I1 of LUT 315, input I0 of LUT 320, and input I0 of LUT 335. Exit points of a strongly connected component are outputs (e.g., pins) of components within the strongly connected component that output a signal that leaves the strongly connected component. The exit point for strongly connected component 385 is output O of LUT 335 since the output connects to pin 360, which is external to strongly connected component 385.

In one or more embodiments, the system is capable of identifying strongly connected components within the circuit design. Any of a variety of known methods of detecting strongly connected components may be used. Example algorithms that the system may use in detecting strongly connected components may include, but are not limited to, Kosaraju's algorithm, Tarjan's strongly connected components algorithm, or the path-based strong component algorithm. Having detected strongly connected components in the circuit design, the system is capable of performing latency verification checks on the strongly connected components.

In one or more embodiments, the system is capable of determining whether the total number of latency changes in each strongly connected component is zero. For example, for each strongly connected component identified in the circuit design, the system is capable of determining whether any of the components that form the strongly connected component have a latency change value other than zero.

In one or more other embodiments, the system is capable of determining whether all the entry points and exit points of each strongly connected component have the same total latency number. In the example of FIG. 3C, the total latency of each of the entry points: input I1 of LUT 315, input I0 of LUT 320, and input I0 of LUT 335, and of the exit point: output O of LUT 335 is 1. Thus, the entry points and exit points of strongly connected component 385 have the same total latency. It should be appreciated that if all entry points of a strongly connected component have the same latency and no insertion has been performed on the strongly connected component, the comparison of total latency of entry points and exit points may not be necessary since the exit points should have the same total latency value as the entry points.

Figure 3D:
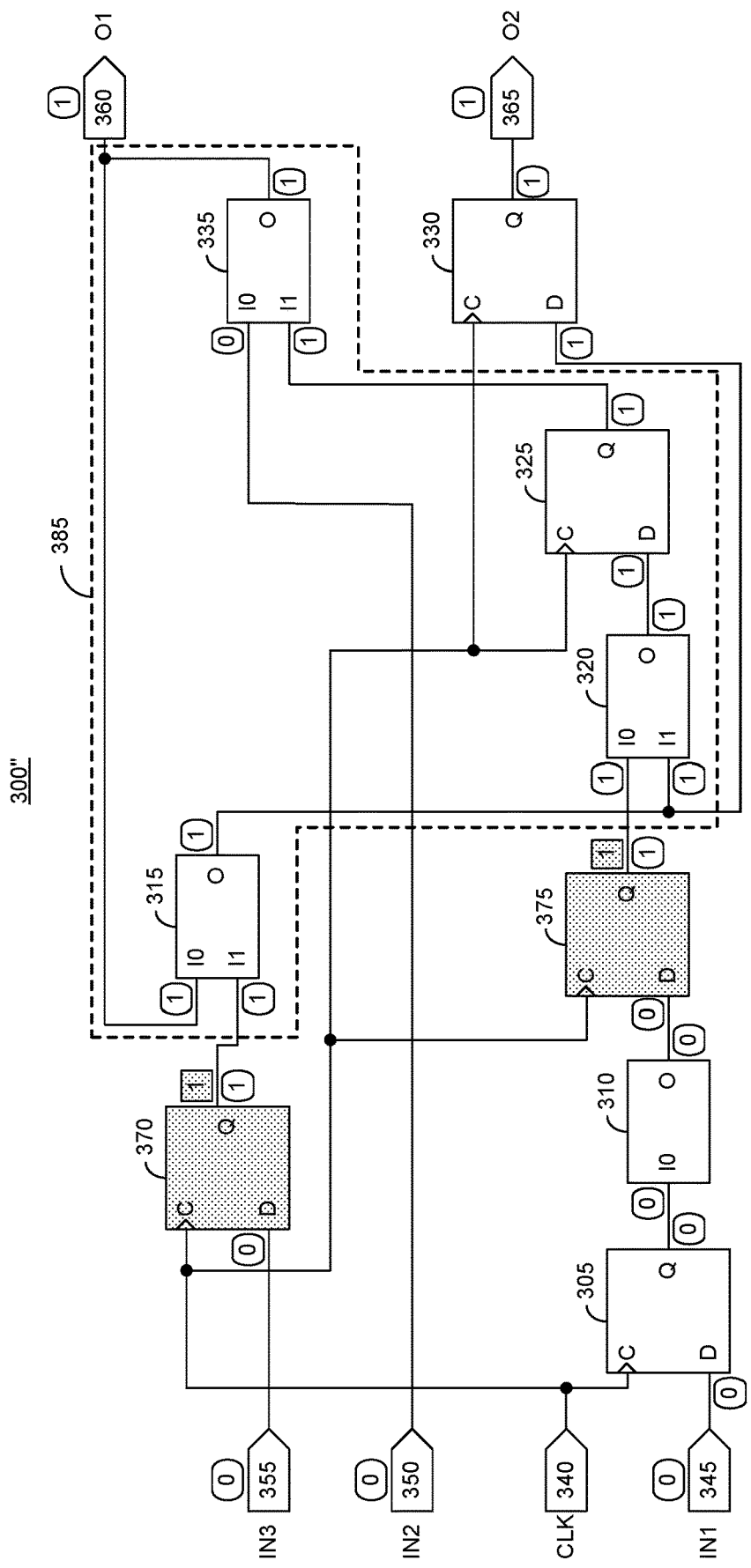

FIG. 3D illustrates another modified version of circuit design 300 (e.g., circuit design 300") as the system performs latency equivalence verification. In the example of FIG. 3D, the system has annotated circuit design 300" with respect to both latency change values and total latencies along the paths from primary inputs to primary outputs. As noted, latency change values are indicated in square, shaded bounding boxes while total latencies are illustrated in rounded bounding boxes.

In the example of FIG. 3D, flip-flop 380 is not included. Whether as a consequence of automated processing or user editing of circuit design 300 using an EDA tool, flip-flop 380 was not included. As a result, the total latency at input I0 and the total latency of I1 of LUT 335 are mismatched (e.g., have different total latencies) thereby indicating a latency error in circuit design 300". LUT 335 further illustrates an example where the total latency of the entry point input I0 of LUT 335 is not equivalent to the total latency of the exit point output O of LUT 335, thereby indicating a latency error. Further, the total latency of the entry point I0 of LUT 335 has a value of 0, while the total latency of another entry point I1 of LUT 315 has a value of 1, thereby indicating a latency error.

In one or more embodiments, the system is capable of providing a notification indicating the results of the latency verification performed. In the case where the system determines that none of the latency verifications (or checks) performed were failed, the system is capable of generating and outputting a notification specifying that no latency errors were detected. In the case where one or more latency errors have been detected, the system is capable of generating and outputting a notification indicating that latency errors have been detected. The notification may specify each type of latency error that has been detected. The notification may also specify a particular location within the circuit design at which the latency error was detected. For example, notification may specify a particular component where a mismatch was detected or where a non-zero latency change value was detected, such as for a particular circuit component within a strongly connected component of the circuit design.

Figure 4:
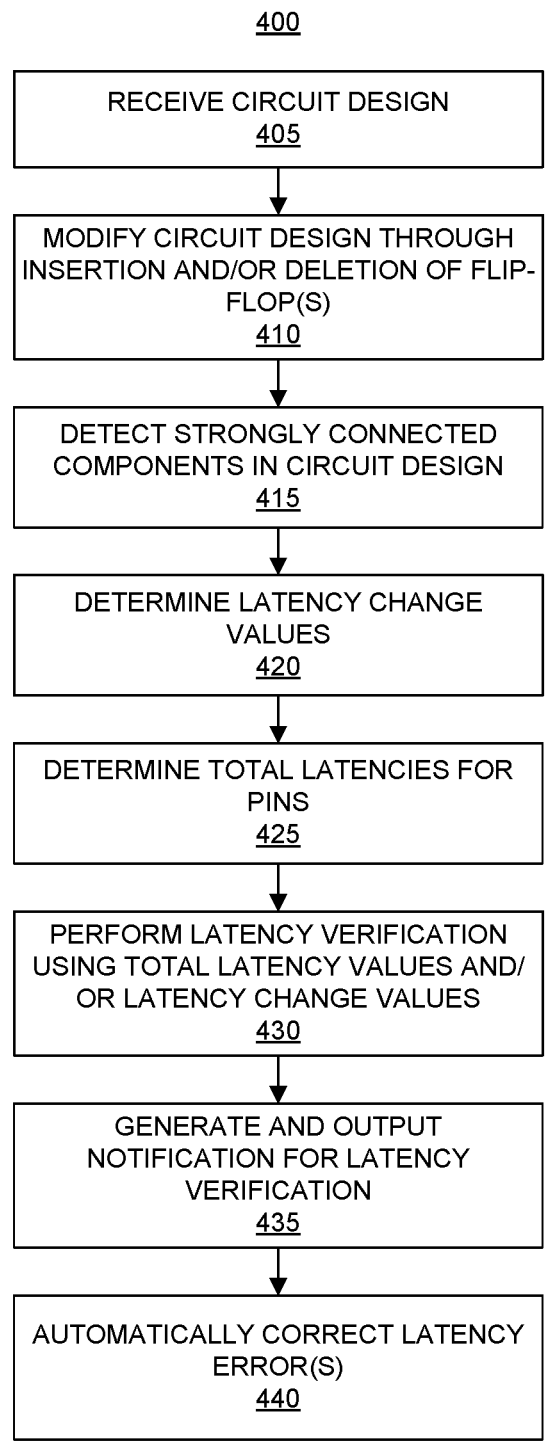
FIG. 4 illustrates an example method of verifying latency equivalence for a circuit design.

FIG. 4 illustrates an example method 400 of verifying latency equivalence for a circuit design. Method 400 may be performed by a system such as system 100 as described in connection with FIG. 1.

In block 405, the system receives a circuit design. The circuit design may be specified as a netlist or specified in another computer readable form. The circuit design, for example, may be derived from a block diagram, a high-level programming language, or a hardware description language.

In block 410, the system is capable of modifying the circuit design. The modification performed by the system may include insertion of one or more flip-flops and/or deletion of one or more flip-flops. In particular embodiments, the system may modify the circuit design in response to user inputs specifying or requesting particular changes to the circuit design. For example, the system may modify the circuit design in response to user requests to add and/or remove flip-flops. In other embodiments, the system may modify the circuit design as part of performing an automated optimization process on the circuit design such as pipelining and/or re-timing. Pipelining and/or retiming, for example, may be performed by the system during synthesis as part of a design flow that implements the circuit design within an IC.

In block 415, the system is capable of detecting strongly connected components in the circuit design. The system is capable of marking each of the strongly connected components detected within the circuit design. The system may mark the strongly connected components by including annotations within the netlist or by maintaining a separate list of the strongly connected components and the constituent circuit components of the circuit design within each strongly connected component.

In block 420, the system is capable of determining latency change values. The system is capable of determining latency change values for pins of components specified in the netlist of the circuit design. For example, the system is capable of determining a latency change value for each synchronous pin of each component within the circuit design.

In block 425, the system is capable of determining total latencies for pins of the circuit design. The system is capable of traversing paths of the circuit design from the primary inputs to the primary outputs and summing the latency change values at each synchronous input pin and at each synchronous output pin of the circuit design. The system may store the sums for each respective pin as the total latency for the pin. The system may store the total latencies for the pins within the netlist or within another data structure that is independent of the netlist.

In one or more embodiments, in calculating the total latencies, latency change values for pins of the circuit may be initialized to zero with the exception of those pins updated in block 420. In another embodiment, the system is capable of creating a list of pins of the circuit design with non-zero latency change values and the value. The system may initialize the latency change values of the circuit design to zero. When determining total latencies by traversing paths, the system may refer to the location in the path and the list of pins to determine the total latencies.

In block 430, the system is capable of performing latency verification using total latencies and/or the latency change values. The system may perform one or more different types of latency verification checks. For example, the system is capable of comparing total latency of pins of components of the circuit design to determine whether mismatches exist between input pins of same circuit components. The system is also capable of performing other latency verification checks relating to strongly connected components.

In block 435, the system is capable of generating and outputting a notification for the latency verification performed in block 430. The notification may indicate whether any latency errors were detected. In the case were latency errors are detected, the notification may specify the particular types of latency errors detected and optionally the location of such errors.

In block 440, the system optionally automatically corrects one or more of the latency errors detected. For example, the system is capable of automatically inserting a flip-flop and/or automatically deleting a flip-flop from the circuit design to correct a latency error detected in block 430. In one or more embodiments, the system is capable of adding and/or removing flip-flops immediately prior to circuit components having synchronous inputs with mismatched total latencies so that the mismatched total latencies become matched. In one or more other embodiments, the system is capable of adding and/or removing flip-flops so that each primary output of the circuit design has a same or equivalent total latency. As illustrated herein, the system may add a positive (e.g., +1) latency change value when inserting a flip-flop and add a negative (e.g., −1) latency change value when removing a flip-flop. The system may add and/or remove flip-flops within the circuit design thereby causing the inclusion of latency change values with the corresponding values (e.g., +1 or −1) to meet the requirements described herein relating to total latency and/or latency change values to correct latency error(s).

Figure 5:
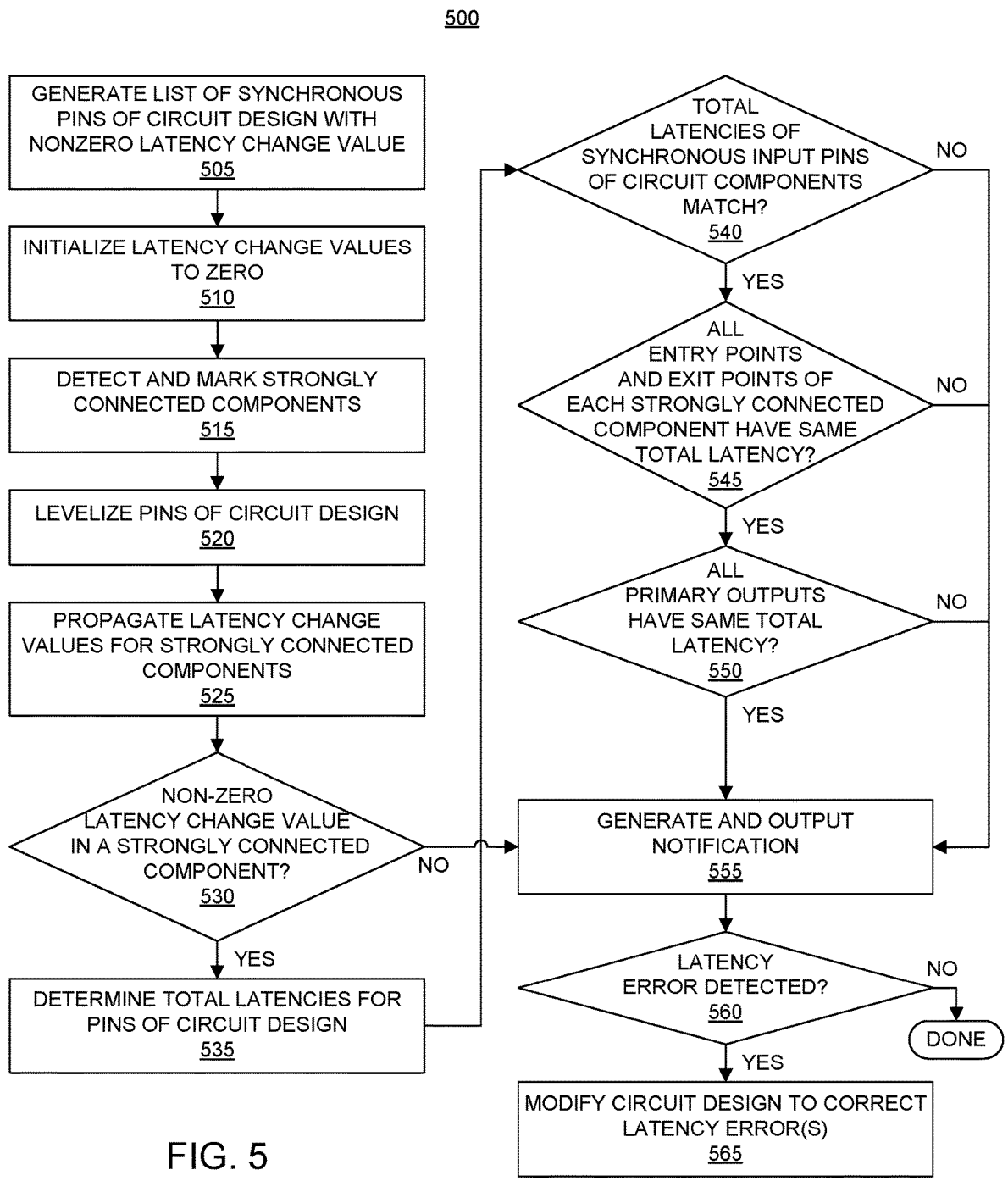
FIG. 5 illustrates another example method of verifying latency equivalence for a circuit design.

FIG. 5 illustrates another example method 500 of verifying latency equivalence for a circuit design. Method 500 may be performed by a system such as system 100 as described in connection with FIG. 1. In certain aspects, method 500 presents a more detailed description of the operations described in connection with FIG. 4. Method 500 may begin in a state where a circuit design has been modified by inserting one or more flip-flops and/or removing one or more flip-flops. In the example of FIG. 5, in the process of modifying the circuit design, the system may update the latency change values for those pins that are drive by a newly inserted flip-flop and/or those pins that were driven by a removed flip-flop accordingly.

In block 505, the system is capable of generating a list of the synchronous pins of the circuit design that have non-zero latency change values. The system may also record the latency change value of such pins. In block 510, the system is capable of initializing each of the latency change values of the circuit design to zero. In block 515, the system is capable of detecting and marking the strongly connected components of the circuit design.

In block 520, the system is capable of levelizing each pin of the circuit design from the primary inputs to the primary outputs. In levelizing the circuit design, the system assigns all pins of a same strongly connected component the same level number. Levelizing the circuit design allows the system to efficiently process the circuit design and avoid traversing a circuit component such as a LUT, for example, multiple times.

In one or more embodiments, by marking strongly connected components in block 515 prior to performing block 520, the system effectively treats each strongly connected component as a single node (e.g., a single circuit element). This marking and separate treatment of strongly connected components by the system effectively removes loops from the circuit design, or allows the system to treat the circuit design as if there are no loops. Without the loops, the system is capable of performing levelization. In one or more embodiments, the system may perform levelizing to determine the total latency value of all inputs of circuit components such as LUTs first. In response to determining a mismatch of total latency at inputs to a LUT, for example, the system may discontinue processing. In cases where the system does not detect a mismatch at the inputs to the LUT, the system may traverse along to the output of the LUT and continue from the output of the LUT.

In block 525, the system is capable of propagating latency changes among each strongly connected component. For example, in block 525, the system may process only the strongly connected components and propagate latency changes among the constituent components of each strongly connected component of the circuit design. In block 530, the system determines whether any of the strongly connected components includes a non-zero latency change value. A pin within any strongly connected component with a non-zero latency change value indicates the insertion or removal of a flip-flop within the strongly connected component and a latency error.

In response to determining that one or more of the strongly connected components has a non-zero latency change value, method 500 proceeds to block 555. In block 555, the system is capable of generating a notification indicating that a latency error has been detected. In one or more embodiments, the notification specifies the type of error that was detected. For example, in the case of block 530, the notification may indicate that a flip-flop has been inserted or the flip-flop has been removed from a strongly connected component of the circuit design. In particular embodiments, the notification may specify the particular location within the circuit design where the error is detected. For example, the notification may specify the strongly connected component, the pin, and/or the circuit component of the strongly connected component that has a non-zero latency change value.

In block 535, the system is capable of determining total latencies for pins of the circuit design. For example, the system may propagate latency change values, per the list of non-zero latency change values, from the primary inputs of the circuit design to the primary outputs of the circuit design. The system may traverse from primary inputs to the primary outputs, without traversing strongly connected components, where the total latency of each pin is the sum of the latency change values of pins of the path from the primary input up to and including the pin. This total latency may be determined by cross-referencing the list of non-zero latency change values of the list generated in block 505 as each path is traversed from primary input to primary output.

For example, referring to FIG. 3C, in traversing from primary input 345 to primary output 360, the total latency of each synchronous pin up to and including input D of flip-flop 375 is zero. Starting at output Q of flip-flop 375 and continuing for each pin up to and including primary output 360, the total latency is 1 due to the only non-zero latency change value of 1 at output Q of flip-flop 375.

In block 540, the system is capable of determining whether, for each circuit component of the circuit design having two or more synchronous input pins, the total latency on each pin matches. For example, referring again to FIG. 3C, the system is capable of traversing from primary input 345 to primary output 360. In doing so, the system checks whether the total latency of input I0 is the same as the total latency of input I1 of LUT 320. The system further checks whether the total latency of input I0 is the same as the total latency of input I1 of LUT 335. In response to determining that at least one circuit component has synchronous input pins with different total latencies, method 500 continues to block 555. In response to determining that no circuit component has synchronous input pins with different total latencies, method 500 may proceed to block 545.

In the case were method 500 continues to block 555 from block 540, the system is capable of generating a notification indicating that a latency error has been detected. In one or more embodiments, the notification specifies the type of error that was detected. For example, in the case of block 540, the notification may indicate a circuit component has mismatched total latencies at the synchronous input pins. In particular embodiments, the notification may specify the particular location within the circuit design where the error is detected, e.g., the mismatched pins and/or the circuit component. In one or more embodiments, the system is capable of specifying the particular latency error that occurs earliest within a given signal path. Fixing such a latency error, for example, may fix other latency errors following the earliest latency error in the signal path.

In block 545, the system is capable of determining whether all entry points and all exit points of each strongly connected component have the same total latency. For example, the total latency of each input of each component in a strongly connected component and the total latency of each output of each component in the strongly connected component should be equal. In response to determining that one or more entry points and/or exit points of a strongly connected component have mismatched total latencies, method 500 continues to block 555. In response to determining that all entry points and all exit points of each strongly connected component do have the same total latencies, method 500 proceeds to block 550.

In the case were method 500 continues to block 555 from block 545, the system is capable of generating a notification indicating that a latency error has been detected. In one or more embodiments, the notification specifies the type of error that was detected. For example, in the case of block 545, the notification may indicate that an entry point and/or an exit point, as the case may be, of a particular strongly connected component is not equivalent. In particular embodiments, the notification may specify the particular location within the circuit design where the error is detected. For example, the system may specify the particular strongly connected component, the particular components of the strongly connected component, and/or the particular entry and/or exit points of the component within the strongly connected component where the mismatch is detected. In one or more embodiments, the system is capable of specifying the particular latency error that occurs earliest within a strongly connected component. Fixing such a latency error, for example, may fix other latency errors following the earliest latency error in the signal path.

In block 550, the system is capable of determining whether all primary outputs of the circuit design have the same total latency. In response to determining that all primary outputs of the circuit design do have the same total latency, method 500 may continue to block 555. In that case, the system has not detected any latency errors within the circuit design and in block 555 the system may generate and output a notification indicating that no latency errors were found.

In response to determining that all primary outputs of the circuit design do not have the same total latency, method 500 may continue to block 555. In the case were method 500 continues to block 555 from block 550, the system is capable of generating a notification indicating that a latency error has been detected. In one or more embodiments, the notification specifies the type of error that was detected. For example, in the case of block 550, the notification may indicate that the total latencies of the primary outputs of the circuit design do not match. In particular embodiments, the notification may specify the particular location within the circuit design where the error is detected. For example, the system may specify the total latency for each of the primary outputs of the circuit design.

In block 560, the system may determine whether a latency error was detected. If so, method 500 may continue to block 565. If not, method 500 may end.

In block 560, the system may optionally modify the circuit design to correct one or more detected latency errors. As discussed, the system is capable of automatically modifying the circuit design by inserting one or more flip-flops and or removing one or more flip-flops in order to ensure that the circuit design passes the various latency checks described within this disclosure.

Figure 6:
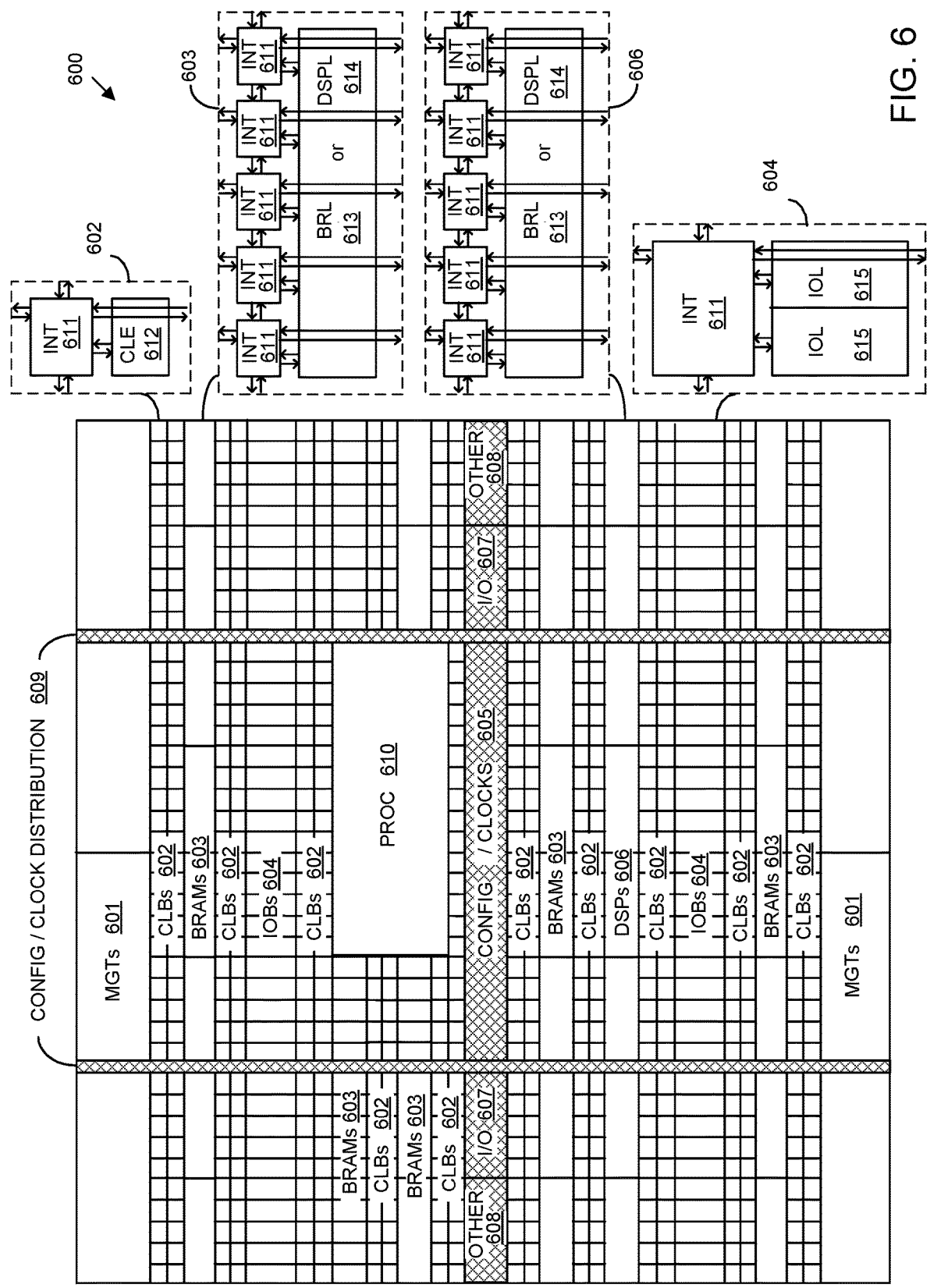
FIG. 6 illustrates an example architecture for an integrated circuit.

FIG. 6 illustrates an example architecture 600 for an IC. In one aspect, architecture 600 may be implemented within a programmable IC. For example, architecture 600 may be used to implement a field programmable gate array (FPGA). Architecture 600 may also be representative of a system-on-chip (SOC) type of IC. An SOC is an IC that includes a processor that executes program code and one or more other circuits. The other circuits may be implemented as hard-wired circuitry, programmable circuitry, and/or a combination thereof. The circuits may operate cooperatively with one another and/or with the processor.

As shown, architecture 600 includes several different types of programmable circuit, e.g., logic, blocks. For example, architecture 600 may include a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized I/O blocks 607 (e.g., configuration ports and clock ports), and other programmable logic 608 such as digital clock managers, analog-to-digital converters, system monitoring logic, and so forth.

In some ICs, each programmable tile includes a programmable interconnect element (INT) 611 having standardized connections to and from a corresponding INT 611 in each adjacent tile. Therefore, INTs 611, taken together, implement the programmable interconnect structure for the illustrated IC. Each INT 611 also includes the connections to and from the programmable logic element within the same tile, as shown by the examples included at the top of FIG. 6.

For example, a CLB 602 may include a configurable logic element (CLE) 612 that may be programmed to implement user logic plus a single INT 611. A BRAM 603 may include a BRAM logic element (BRL) 613 in addition to one or more INTs 611. Typically, the number of INTs 611 included in a tile depends on the height of the tile. As pictured, a BRAM tile has the same height as five CLBs, but other numbers (e.g., four) also may be used. A DSP tile 606 may include a DSP logic element (DSPL) 614 in addition to an appropriate number of INTs 611. An 10B 604 may include, for example, two instances of an I/O logic element (IOL) 615 in addition to one instance of an INT 611. The actual I/O pads connected to IOL 615 may not be confined to the area of IOL 615.

In the example pictured in FIG. 6, a columnar area near the center of the die, e.g., formed of regions 605, 607, and 608, may be used for configuration, clock, and other control logic. Horizontal areas 609 extending from this column may be used to distribute the clocks and configuration signals across the breadth of the programmable IC.

Some ICs utilizing the architecture illustrated in FIG. 6 include additional logic blocks that disrupt the regular columnar structure making up a large part of the IC. The additional logic blocks may be programmable blocks and/or dedicated circuitry. For example, a processor block depicted as PROC 610 spans several columns of CLBs and BRAMs.

In one aspect, PROC 610 may be implemented as dedicated circuitry, e.g., as a hardwired processor, that is fabricated as part of the die that implements the programmable circuitry of the IC. PROC 610 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 610 may be omitted from architecture 600 and replaced with one or more of the other varieties of the programmable blocks described. Further, such blocks may be utilized to form a "soft processor" in that the various blocks of programmable circuitry may be used to form a processor that can execute program code as is the case with PROC 610.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 6 that are external to PROC 610 such as CLBs 602 and BRAMs 603 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 610.

In some instances, hardwired circuitry may have one or more operational modes that can be set or selected according to flip-flop settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 610 or a soft processor. In some cases, architecture 600 includes a dedicated configuration processor that loads the configuration bitstream to the appropriate configuration memory and/or processor memory. The dedicated configuration processor does not execute user-specified program code. In other cases, architecture 600 may utilize PROC 610 to receive the configuration bitstream, load the configuration bitstream into appropriate configuration memory, and/or extract program code for execution.

FIG. 6 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 6 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 610 within the IC are for purposes of illustration only and are not intended as limitations.

An IC have an architecture the same as or similar to that of architecture 600 may be used to implement a circuit design as described within this disclosure. CLBs 602, for example, may include one or more LUTs and one or more flip-flops. Other circuit blocks including, but not limited to, BRAMs 602 and/or DSPs 606 may also include flip-flops. The circuit design may undergo further verification and/or other testing and any remaining phases of a design flow process (e.g., synthesis, place, route, and/or bitstream generation) such that the resulting circuit design may be implemented within the IC.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one or more embodiments, a method may include determining, using computer hardware, latency change values for pins of components of the circuit design, wherein the circuit design is modified by at least one of inserting a flip-flop or removing a flip-flop, determining, using the computer hardware, total latency for the pins of the components of the circuit design based, at least in part, upon the latency change values, and comparing, using the computer hardware, total latency of the pins of the components of the circuit design to determine a mismatch. The method may also include detecting, using the computer hardware, a latency error within the circuit design based upon the comparing and generating, using the computer hardware, a notification of the latency error in the circuit design, wherein the notification specifies a type of the latency error detected.

In an aspect, the notification specifies a location within the circuit design where the latency error is detected.

In another aspect, the detecting the latency error may include detecting a mismatch of total latency on primary outputs of the circuit design.

In another aspect, the method may include detecting a strongly connected component within the circuit design.

In another aspect, the detecting the latency error may include detecting at least one of an entry point or an exit point of the strongly connected component of the circuit design having a mismatched total latency (e.g., relative to total latencies of pins in the strongly connected component).

In another aspect, the detecting the latency error may include detecting a non-zero latency change value for a synchronous input pin or a synchronous output pin of a component within the strongly connected component of the circuit design.

In another aspect, the method may include automatically modifying the circuit design by performing at least one of flip-flop insertion or deletion to correct the latency error.

In one or more embodiments, a system includes a memory configured to store program code and a processor coupled to the memory. The processor, in response to executing the program code, is configured to initiate operations. The operations may include determining latency change values for pins of components of the circuit design, wherein the circuit design is modified by at least one of inserting a flip-flop or removing a flip-flop, determining total latency for the pins of the components of the circuit design based, at least in part, upon the latency change values, and comparing total latency of the pins of the components of the circuit design to determine a mismatch. The operations may also include detecting a latency error within the circuit design based upon the comparing and generating a notification of the latency error in the circuit design, wherein the notification specifies a type of the latency error detected.

In an aspect, the notification specifies a location within the circuit design where the latency error is detected.

In another aspect, the detecting the latency error may include detecting a mismatch of total latency on primary outputs of the circuit design.

In another aspect, the processor may be configured to initiate operations further including detecting a strongly connected component within the circuit design.

In another aspect, the detecting the latency error may include detecting at least one of an entry point or an exit point of the strongly connected component of the circuit design having a mismatched total latency (e.g., relative to total latencies of pins in the strongly connected component).

In another aspect, the detecting the latency error may include detecting a non-zero latency change value for a synchronous input pin or a synchronous output pin of a component within the strongly connected component of the circuit design.

In another aspect, the processor may be configured to initiate operations further including automatically modifying the circuit design by performing at least one of flip-flop insertion or deletion to correct the latency error.

In one or more embodiments, a computer program product includes a computer readable storage medium having program code stored thereon. The program code is executable by a processor to perform operations. The operations may include determining latency change values for pins of components of a circuit design, wherein the circuit design is modified by at least one of inserting a flip-flop or removing a flip-flop, determining total latency for the pins of the components of the circuit design based, at least in part, upon the latency change values, and comparing total latency of the pins of the components of the circuit design to determine a mismatch. The operations may also include detecting a latency error within the circuit design based upon the comparing and generating a notification of the latency error in the circuit design, wherein the notification specifies a type of the latency error detected.

In an aspect, the notification specifies a location within the circuit design where the latency error is detected.

In another aspect, the detecting the latency error may include detecting a mismatch of total latency on primary outputs of the circuit design.

In another aspect, the program code may be executable by the computer hardware to initiate operations further including detecting a strongly connected component within the circuit design.

In another aspect, the program code may be executable by the computer hardware to initiate operations further including detecting at least one of an entry point or an exit point of the strongly connected component of the circuit design having a mismatched total latency (e.g., relative to total latencies of pins in the strongly connected component).

In another aspect, the program code may be executable by the computer hardware to initiate operations further including detecting a non-zero latency change value for a synchronous input pin or a synchronous output pin of a component within the strongly connected component of the circuit design.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method for verifying a circuit design, comprising:
   determining, using computer hardware, latency change values for pins of components of the circuit design, wherein the circuit design is modified by at least one of inserting a flip-flop or removing a flip-flop;
   determining, using the computer hardware, a total latency for each synchronous input pin and for each synchronous output pin of the components of the circuit design based, at least in part, upon summing the latency change values;
   comparing, using the computer hardware, the total latencies of the synchronous input pins of at least one of the components of the circuit design having two or more synchronous input pins to determine a mismatch;
   detecting, using the computer hardware, a latency error within the circuit design based upon the comparing; and
   generating, using the computer hardware, a notification of the latency error in the circuit design, wherein the notification specifies a type of the latency error detected.

2. The method of claim 1, wherein the notification specifies a location within the circuit design where the latency error is detected.

3. The method of claim 1, wherein the detecting the latency error further comprises:
   detecting a mismatch of the total latencies on primary outputs of the circuit design.

4. The method of claim 1, further comprising:
   detecting a strongly connected component within the circuit design.

5. The method of claim 4, wherein the detecting the latency error further comprises:
   detecting at least one of an entry point or an exit point of the strongly connected component of the circuit design having a mismatched total latency.

6. The method of claim 4, wherein the detecting the latency error further comprises:
   detecting a non-zero latency change value for a selected synchronous input pin or a selected synchronous output pin of a component within the strongly connected component of the circuit design.

7. The method of claim 1, further comprising:
   automatically modifying the circuit design by performing at least one of flip-flop insertion or deletion to correct the latency error.

8. A system for verifying a circuit design, comprising:
   a memory configured to store program code; and
   a processor coupled to the memory, wherein the processor, in response to executing the program code, is configured to initiate operations including:
   determining latency change values for pins of components of the circuit design, wherein the circuit design is modified by at least one of inserting a flip-flop or removing a flip-flop;
   determining a total latency for each synchronous input pin and for each synchronous output pin of the components of the circuit design based, at least in part, upon summing the latency change values;
   comparing the total latencies of the synchronous input pins of at least one of the components of the circuit design having two or more synchronous input pins to determine a mismatch;
   detecting a latency error within the circuit design based upon the comparing; and
   generating a notification of the latency error in the circuit design, wherein the notification specifies a type of the latency error detected.

9. The system of claim 8, wherein the notification specifies a location within the circuit design where the latency error is detected.

10. The system of claim 8, wherein the detecting the latency error further comprises:
    detecting a mismatch of the total latencies on primary outputs of the circuit design.

11. The system of claim 8, wherein the processor is configured to initiate operations further comprising:

detecting a strongly connected component within the circuit design.

12. The system of claim 11, wherein the detecting the latency error further comprises:
   detecting at least one of an entry point or an exit point of the strongly connected component of the circuit design having a mismatched total latency.

13. The system of claim 11, wherein the detecting the latency error further comprises:
   detecting a non-zero latency change value for a selected synchronous input pin or a selected synchronous output pin of a component within the strongly connected component of the circuit design.

14. The system of claim 8, wherein the processor is configured to initiate operations further comprising:
   automatically modifying the circuit design by performing at least one of flip-flop insertion or deletion to correct the latency error.

15. A computer program product, comprising:
   a computer readable storage medium having program code stored thereon, the program code executable by computer hardware to initiate operations including:
   determining latency change values for pins of components of a circuit design, wherein the circuit design is modified by at least one of inserting a flip-flop or removing a flip-flop;
   determining a total latency for each synchronous input pin and for each synchronous output pin of the components of the circuit design based, at least in part, upon summing the latency change values;
   comparing the total latencies of the synchronous input pins of at least one of the components of the circuit design having two or more synchronous input pins to determine a mismatch;
   detecting a latency error within the circuit design based upon the comparing; and
   generating a notification of the latency error in the circuit design, wherein the notification specifies a type of the latency error detected.

16. The computer program product of claim 15, wherein the notification specifies a location within the circuit design where the latency error is detected.

17. The computer program product of claim 15, wherein the detecting the latency error further comprises:
   detecting a mismatch of the total latencies on primary outputs of the circuit design.

18. The computer program product of claim 15, wherein the program code executable by the computer hardware to initiate operations further comprising:
   detecting a strongly connected component within the circuit design.

19. The computer program product of claim 18, wherein the program code executable by the computer hardware to initiate operations further comprising:
   detecting at least one of an entry point or an exit point of the strongly connected component of the circuit design having a mismatched total latency.

20. The computer program product of claim 18, wherein the program code executable by the computer hardware to initiate operations further comprising:
   detecting a non-zero latency change value for a selected synchronous input pin or a selected synchronous output pin of a component within the strongly connected component of the circuit design.

* * * * *